US009383180B2

(12) United States Patent
Rastegar et al.

(10) Patent No.: US 9,383,180 B2
(45) Date of Patent: Jul. 5, 2016

(54) GRAVITY DROPPED SMALL WEAPON ELECTRONIC SAFE ARM FUZE AND ENERGY HARVESTING DEVICE FOR POWER GENERATION ONBOARD GRAVITY DROPPED WEAPONS

(71) Applicants: Jahangir S Rastegar, Stony Brook, NY (US); Richard T Murray, Patchogue, NY (US)

(72) Inventors: Jahangir S Rastegar, Stony Brook, NY (US); Richard T Murray, Patchogue, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 13/797,938

(22) Filed: Mar. 12, 2013

(65) Prior Publication Data

US 2014/0060367 A1 Mar. 6, 2014

Related U.S. Application Data

(60) Provisional application No. 61/609,893, filed on Mar. 12, 2012, provisional application No. 61/610,457, filed on Mar. 13, 2012.

(51) Int. Cl.
| | |
|---|---|
| *F03G 3/00* | (2006.01) |
| *F42C 11/00* | (2006.01) |
| *H02K 7/18* | (2006.01) |
| *H02N 2/18* | (2006.01) |
| *F42C 15/40* | (2006.01) |

(52) U.S. Cl.
CPC ............. *F42C 11/008* (2013.01); *F42C 15/40* (2013.01); *H02K 7/1807* (2013.01); *H02K 7/1853* (2013.01); *H02N 2/18* (2013.01)

(58) Field of Classification Search
USPC ................................ 290/1 R, 53; 340/545.1
See application file for complete search history.

(56) References Cited

U.S. PATENT DOCUMENTS

| | | | | | |
|---|---|---|---|---|---|
| 735,510 | A | * | 8/1903 | Hergenhan et al. | ............ 60/501 |
| 3,959,663 | A | * | 5/1976 | Rusby | ............ 290/53 |
| 4,124,182 | A | * | 11/1978 | Loeb | ............ 244/153 R |
| 4,145,885 | A | * | 3/1979 | Solell | ............ 60/504 |
| 4,228,360 | A | * | 10/1980 | Navarro | ............ 290/43 |
| 4,434,375 | A | * | 2/1984 | Taylor | ............ 290/53 |
| 4,610,140 | A | * | 9/1986 | Thompson, Jr. | ............ 60/506 |
| 4,612,768 | A | * | 9/1986 | Thompson, Jr. | ............ 60/506 |
| 5,020,411 | A | * | 6/1991 | Rowan | ............ 89/1.11 |
| 5,460,099 | A | * | 10/1995 | Matsuhisa et al. | ............ 105/148 |
| 5,533,719 | A | * | 7/1996 | Crowley et al. | ............ 270/52.09 |
| 5,880,532 | A | * | 3/1999 | Stopher | ............ 290/1 E |
| 5,909,784 | A | * | 6/1999 | Best | ............ 185/10 |
| 5,929,531 | A | * | 7/1999 | Lagno | ............ 290/53 |
| 6,199,664 | B1 | * | 3/2001 | Tkaczyk et al. | ............ 185/39 |
| 6,316,906 | B1 | * | 11/2001 | Lozada | ............ 320/101 |
| 6,619,449 | B2 | * | 9/2003 | Liao | ............ 191/12.2 R |
| 6,825,574 | B1 | * | 11/2004 | Mooring | ............ 290/1 R |
| 7,045,912 | B2 | * | 5/2006 | Leijon et al. | ............ 290/42 |
| 7,109,594 | B2 | * | 9/2006 | Liao | ............ 290/1 C |
| 7,304,398 | B1 | * | 12/2007 | Kim et al. | ............ 290/1 E |
| 7,315,092 | B2 | * | 1/2008 | Cook | ............ 290/53 |
| 7,319,278 | B2 | * | 1/2008 | Gehring | ............ 290/53 |

(Continued)

*Primary Examiner* — Pedro J Cuevas

(57) ABSTRACT

A generator including: a member having a cable wound thereon, the cable having a free end; a spring for storing energy as the cable is unwound from the member by pulling on the free end; and an electromagnetic generator operatively connected to the member such that rotation of the member is transferred to an input side of the electromagnetic generator after the cable is unwound from the member and the stored energy in the spring turns the member.

11 Claims, 17 Drawing Sheets

(56) References Cited

U.S. PATENT DOCUMENTS

| | | | |
|---|---|---|---|
| 7,415,930 B2 * | 8/2008 | Raphelt et al. | 102/475 |
| 7,459,802 B2 * | 12/2008 | Loui et al. | 290/53 |
| 7,476,984 B2 * | 1/2009 | Kim et al. | 290/1 E |
| 7,522,042 B2 * | 4/2009 | Milo | 340/545.1 |
| 7,626,281 B2 * | 12/2009 | Kawai | 290/54 |
| 7,683,500 B2 * | 3/2010 | Greenspan et al. | 290/53 |
| 7,834,471 B2 * | 11/2010 | Cripps | 290/1 E |
| 7,847,421 B2 * | 12/2010 | Gardner et al. | 290/1 R |
| 7,936,079 B2 * | 5/2011 | Rees et al. | 290/55 |
| 8,013,457 B2 * | 9/2011 | Bulthaup et al. | 290/1 R |
| 8,030,786 B2 * | 10/2011 | Jackson et al. | 290/1 R |
| 8,093,731 B2 * | 1/2012 | Bulthaup et al. | 290/1 R |
| 8,115,327 B2 * | 2/2012 | Yomoda et al. | 290/1 E |
| 8,138,618 B2 * | 3/2012 | Tseng | 290/1 C |
| 8,148,832 B2 * | 4/2012 | Cripps | 290/1 E |
| 8,183,746 B2 * | 5/2012 | Rastegar | 310/339 |
| 8,350,394 B2 * | 1/2013 | Cottone et al. | 290/1 R |
| 8,446,034 B1 * | 5/2013 | Stevens | 290/55 |
| 8,450,870 B1 * | 5/2013 | Stevens | 290/54 |
| 8,596,181 B2 * | 12/2013 | Root, Jr. | 89/1.81 |
| 8,686,583 B2 * | 4/2014 | Bender | 290/53 |
| 8,866,316 B2 * | 10/2014 | Wood et al. | 290/1 R |
| 8,901,766 B2 * | 12/2014 | Werjefelt | 290/53 |
| 2007/0107619 A1 * | 5/2007 | Raphelt et al. | 102/473 |
| 2007/0210580 A1 * | 9/2007 | Roberts et al. | 290/1 R |
| 2007/0268132 A1 * | 11/2007 | Milo | 340/545.1 |
| 2007/0278902 A1 * | 12/2007 | Rastegar et al. | 310/339 |
| 2008/0074083 A1 * | 3/2008 | Yarger et al. | 320/137 |
| 2008/0122225 A1 * | 5/2008 | Smith | 290/42 |
| 2008/0174273 A1 * | 7/2008 | Priya et al. | 320/114 |
| 2009/0322092 A1 * | 12/2009 | Werjefelt | 290/53 |
| 2010/0000463 A1 * | 1/2010 | Root, Jr. | 114/316 |
| 2010/0038916 A1 * | 2/2010 | Yomoda et al. | 290/1 E |
| 2010/0045119 A1 * | 2/2010 | Jackson et al. | 310/20 |
| 2010/0236440 A1 * | 9/2010 | Rastegar | 102/209 |
| 2011/0042954 A1 * | 2/2011 | Werjefelt | 290/53 |
| 2014/0225376 A1 * | 8/2014 | Rastegar et al. | 290/1 E |

* cited by examiner

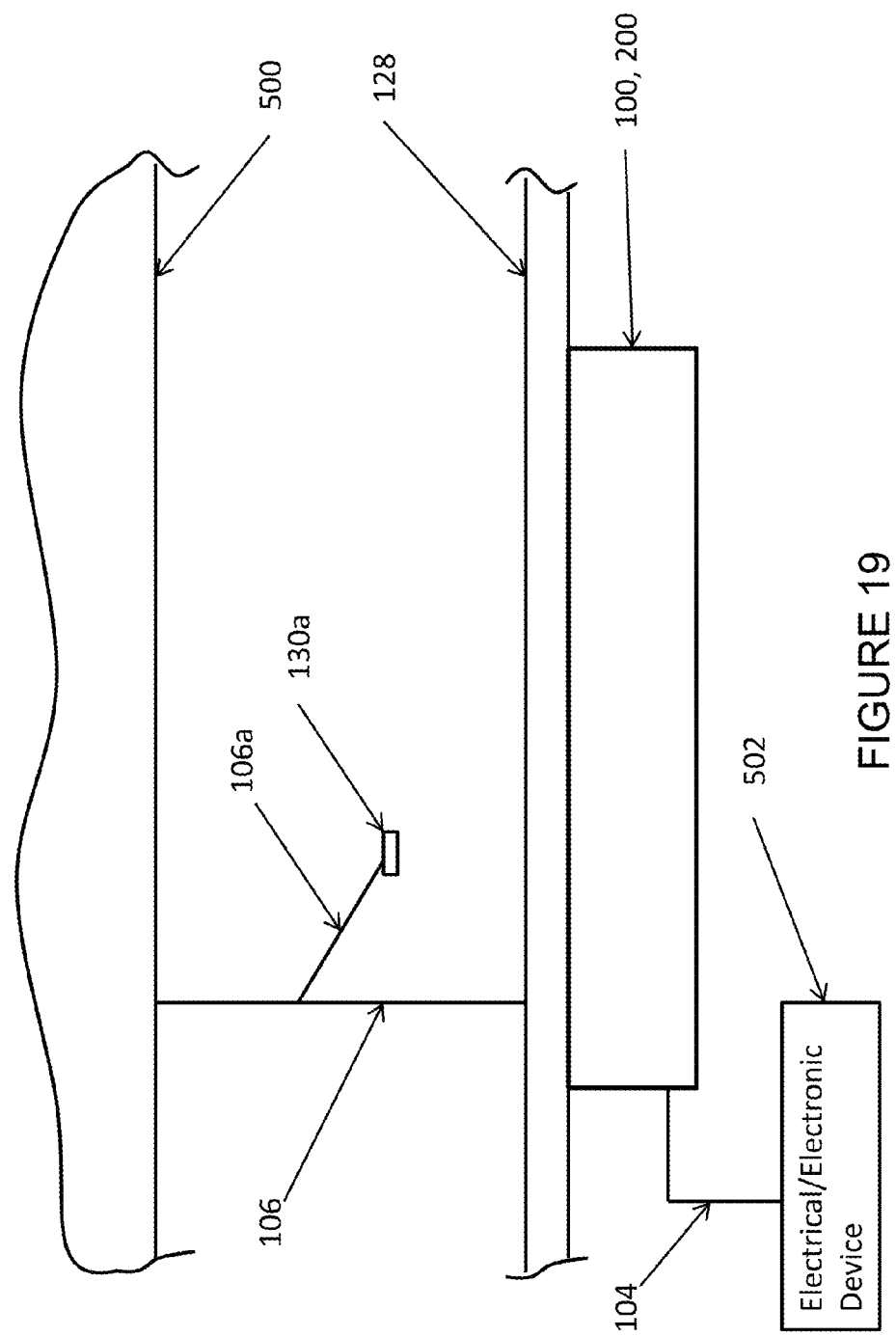

GRAVITY DROPPED SMALL WEAPON ELECTRONIC SAFE ARM FUZE AND ENERGY HARVESTING DEVICE FOR POWER GENERATION ONBOARD GRAVITY DROPPED WEAPONS

CROSS-REFERENCE TO RELATED APPLICATIONS

This application claims the priority to prior filed U.S. Provisional Applications 61/609,893 filed on Mar. 12, 2012 and 61/610,457 filed on Mar. 13, 2012, the contents of each of which are incorporated herein by reference.

GOVERNMENT RIGHTS

This invention was made with Government support under contract FA8651-10-C-0145 awarded by the United States Air Force. The Government has certain rights in the invention.

BACKGROUND

1. Field of the Invention the present invention relates generally to safe arm fuses and power generation devices for gravity dropped weapons, and more particularly to gravity dropped small weapon electronic safe arm fuze and energy harvesting device for power generation onboard gravity dropped weapons.

2. Prior Art

All weapon systems require fuzing systems for their safe and effective operation. A fuze or fuzing system is designed to provide as a primary role safety and arming functions to preclude munitions arming before the desired position or time, and to sense a target or respond to one or more prescribed conditions, such as elapsed time, pressure, or command, and initiate a train of fire or detonation in a munition.

Fuze safety systems consist of an aggregate of devices (e.g., environment sensors, timing components, command functioned devices, logic functions, plus the initiation or explosive train interrupter, if applicable) included in the fuze to prevent arming or functioning of the fuze until a valid launch environment has been sensed and the arming delay has been achieved.

Safety and arming devices are intended to function to prevent the fuzing system from arming until an acceptable set of conditions (generally at least two independent conditions) have been achieved.

A significant amount of effort has been expended to miniaturize military weapons to maximize their payload and their effectiveness and to support unmanned missions. The physical tasking of miniaturization efforts have been addressed to a great extent. However, the same cannot be said regarding ordnance technologies that support system functional capabilities, for example for the case for fuzing.

It is important to note that simple miniaturization of subsystems alone will not achieve the desired goal of effective fuzing for smaller weapons. This is particularly the case in regards to environmental sensing and the use of available stimuli in support of "safe" and "arm" functionality in fuzing of miniature weapon technologies.

A need therefore exists for the development of methods and devices that utilize available external stimuli and relevant detectable events for the design of innovative miniature "safe" and "arm" (S&A) mechanisms for fuzing of gravity dropped small weapons.

SUMMARY

Accordingly, a generator is provided. the generator comprising: a member having a cable wound thereon, the cable having a free end; a spring for storing energy as the cable is unwound from the member by pulling on the free end; and an electromagnetic generator operatively connected to the member such that rotation of the member is transferred to an input side of the electromagnetic generator after the cable is unwound from the member and the stored energy in the spring turns the member.

The generator can further comprise a casing having an opening to expose the free end of the cable.

The member can be a drum. The drum can include a drum gear which turns with the drum. The electromagnetic generator can include a generator input gear on the input side at least indirectly connected to the drum gear. The generator can further comprise a clutch having a clutch input gear engaged with the drum gear and a clutch output gear engaged with the generator input gear, wherein the clutch is configured to transfer rotation of the clutch input gear to rotation of the clutch output gear after the cable is unwound from the member and the stored energy in the spring turns the drum.

The spring can have a first end connected to the member and a second end connected to the casing.

The generator can further comprise a clutch gear operatively connected to the drum such that the rotation of the drum is at least indirectly transmitted to the generator after the cable is unwound from the drum and the stored energy in the spring turns the drum. The generator can further comprise a shaft connecting the drum and the clutch gear. The spring can have a first end connected to the drum and a second end connected to the shaft. The generator can further comprise a flywheel having an input selectively engaged with an output of the clutch gear and an output operatively connected to an input of the electromagnetic generator. The generator can further comprise a mechanism for locking and unlocking the flywheel.

The electromagnetic generator can be electrically connected to a device for providing power to a component of the device. The device can be a munition.

The generator can further comprise a secondary generator for producing power resulting from motion of the casing. The secondary generator can be one or more piezoelectric elements.

Also provided is a munition comprising: a shell; and a generator comprising: a member having a cable wound thereon, the cable having a free end configured to be connected to a portion of an aircraft; a spring for storing energy as the cable is unwound from the member due to separation of the shell from the portion of the aircraft; and an electromagnetic generator operatively connected to the member such that rotation of the member is transferred to an input side of the electromagnetic generator after the cable is unwound from the member and the stored energy in the spring turns the member.

The munition can further comprise an air velocity sensor for distinguishing separation of the munition from the portion of the aircraft while in flight from another event in which power from the generator is not desired, wherein the generator output is controlled based on an output of the air velocity sensor.

Still further provided is a method for generating power in a gravity dropped munition. The method comprising: attaching a cable from a generator associated with the munition to a portion of an aircraft; separating the munition from the aircraft to pull the cable from the munition; converting the pulling of the cable to a rotation; producing power from the rotation; and providing the power to an internal component of the munition.

The method can further comprise: sensing an air velocity at the munition for distinguishing separation of the munition from the portion of the aircraft while in flight from another event in which power from the generator is not desired; and controlling the generator output based on an output of the air velocity sensor.

BRIEF DESCRIPTION OF THE DRAWINGS

These and other features, aspects, and advantages of the apparatus of the present invention will become better understood with regard to the following description, appended claims, and accompanying drawings where:

FIG. 19 illustrates a munition having a generator and being separated from a portion of an aircraft.

DETAILED DESCRIPTION OF THE PREFERRED EMBODIMENT

Figure 1:
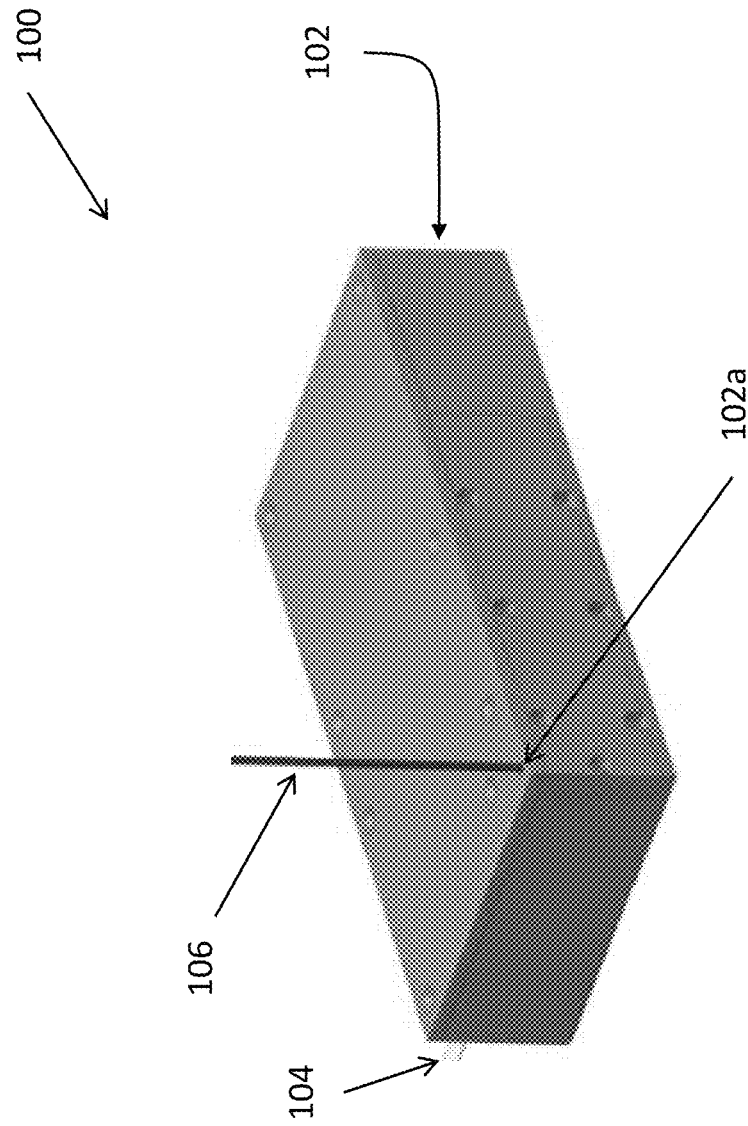
FIG. 1 illustrates an isometric view of a dynamo-type event-detection and power generator.
Figure 2:
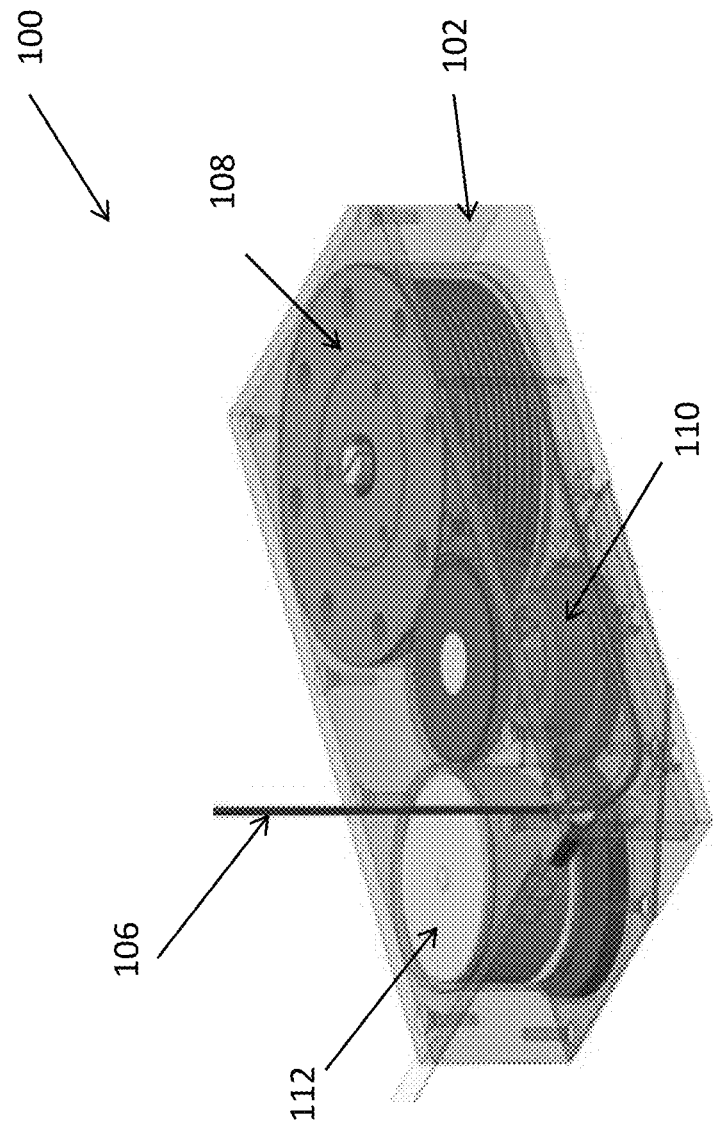
FIG. 2 illustrates the Internal components of the dynamo-type event-detection and power generator of FIG. 1.
Figure 3:
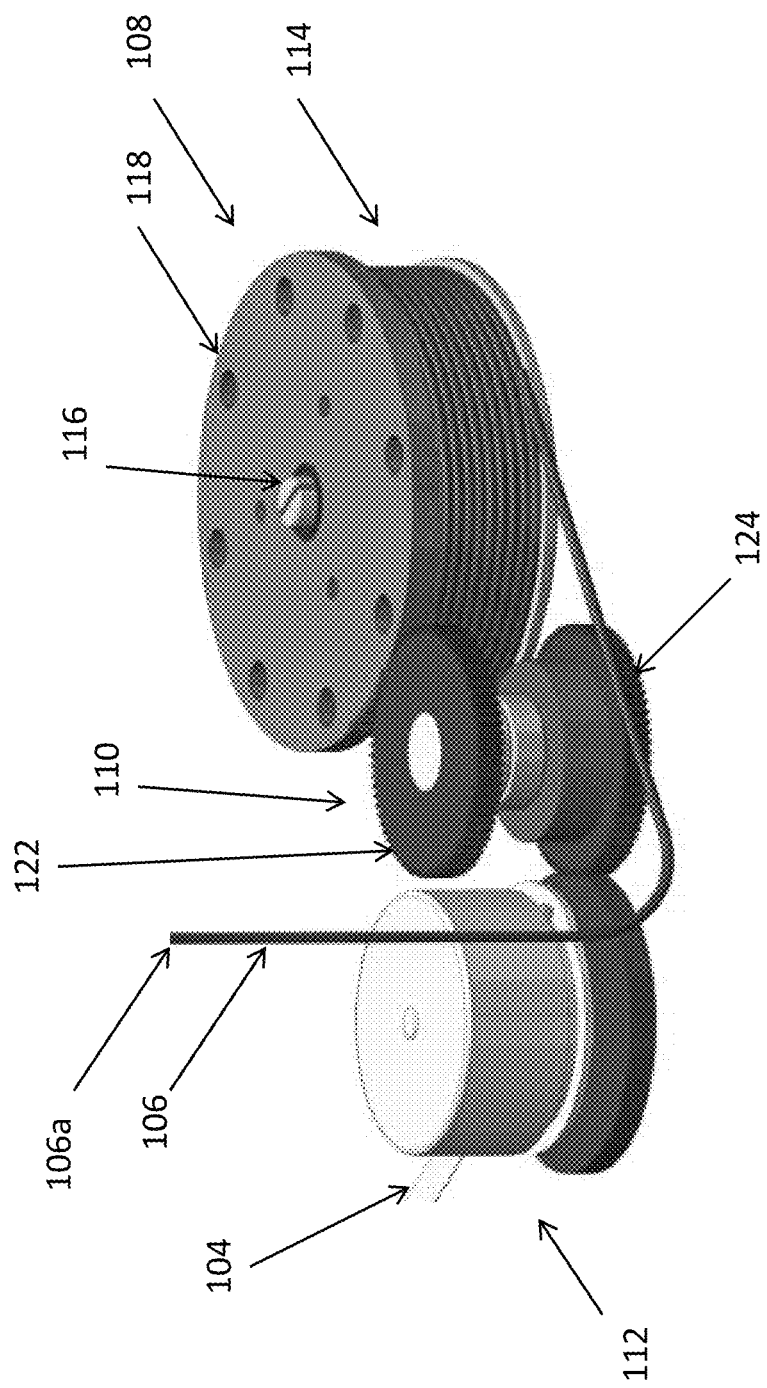
FIG. 3 illustrates a close-up view of the three main sub-assemblies of the dynamo-type event-detection and power generator of FIG. 2.
Figure 4:
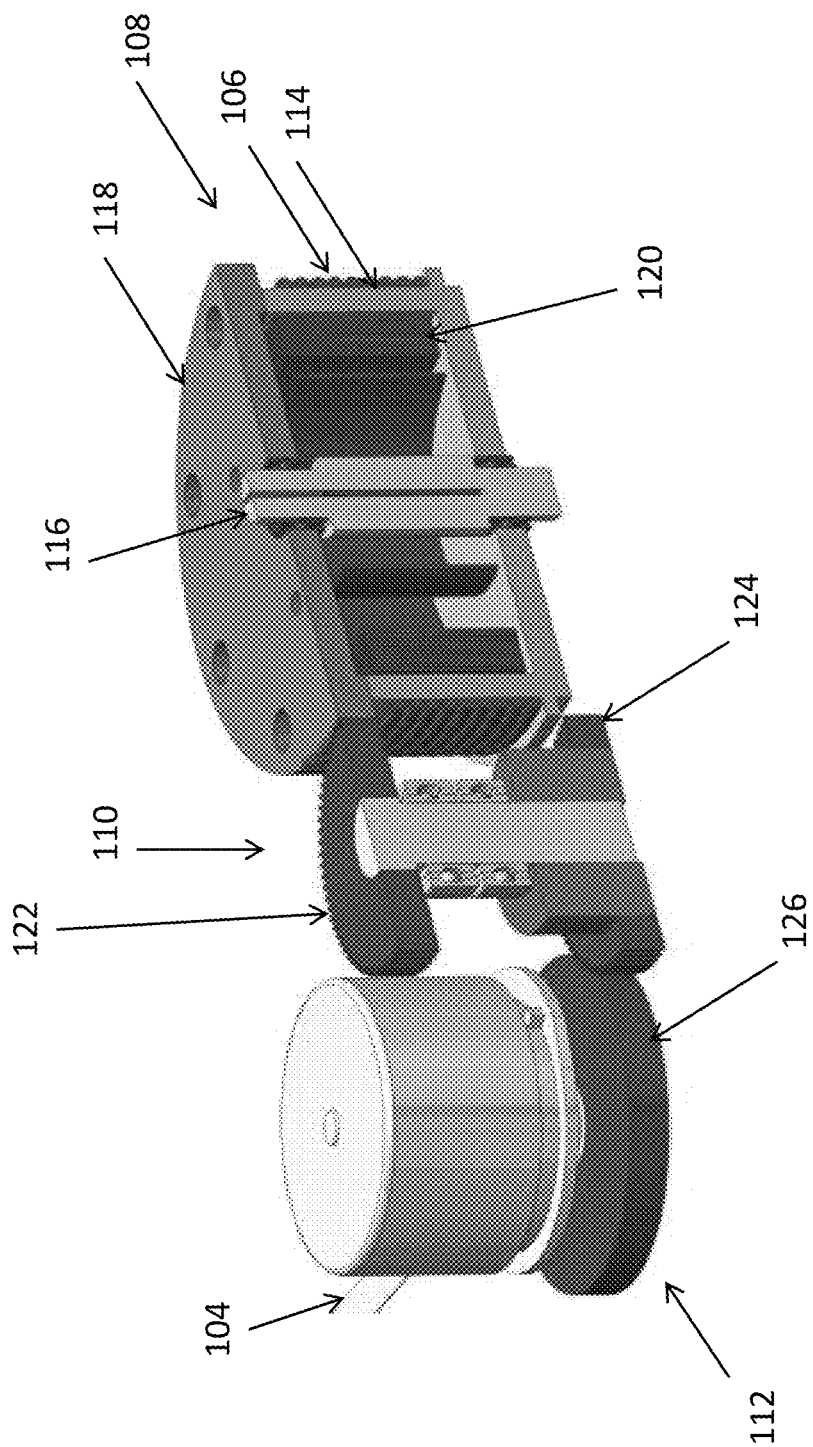
FIG. 4 illustrates a first cut-away view of the three main sub-assemblies of the dynamo-type event-detection and power generator of FIG. 3.
Figure 5:
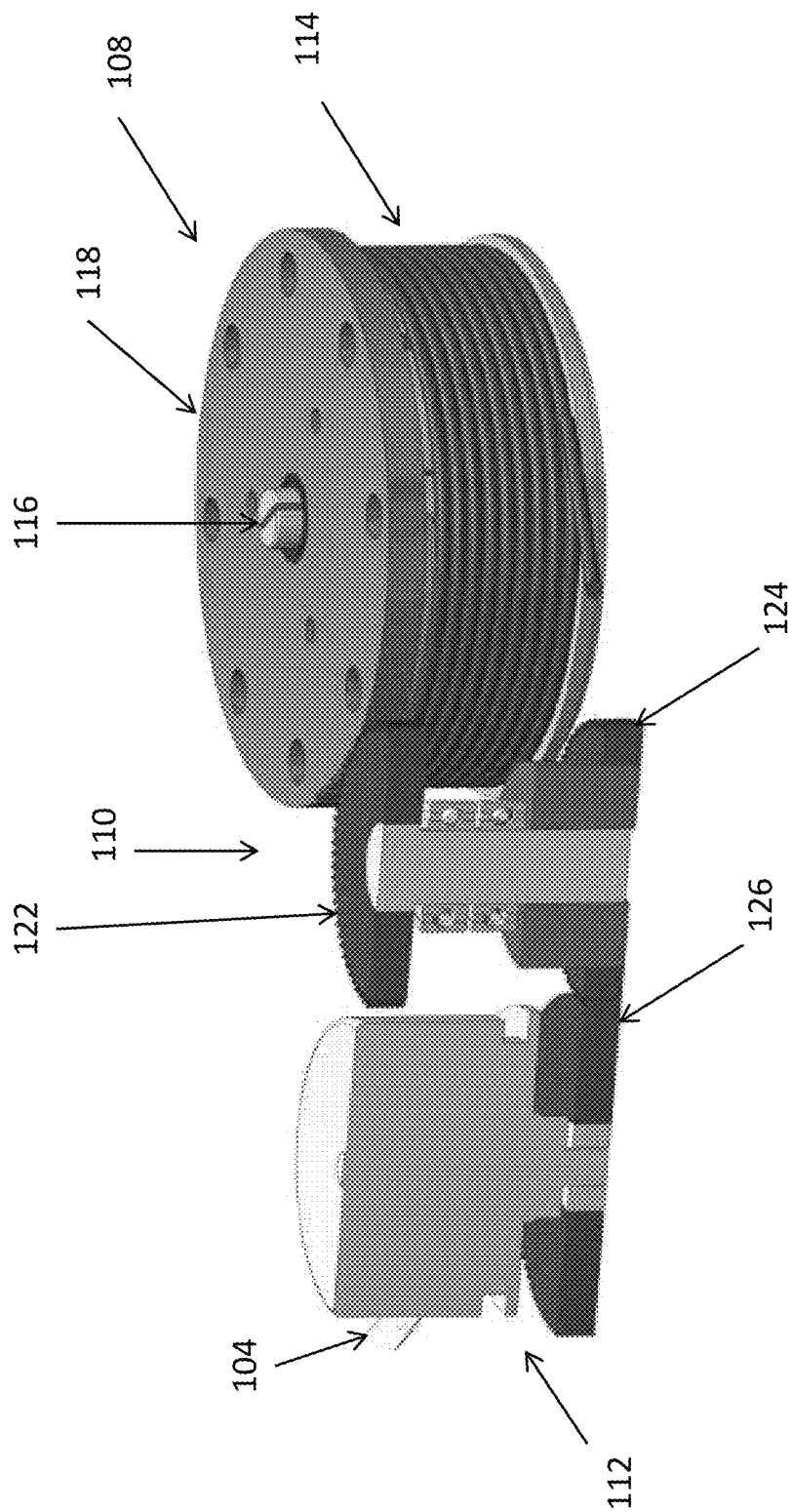
FIG. 5 illustrates a second cut-away view of the three main sub-assemblies of the dynamo-type event-detection and power generator of FIG. 3.

FIG. 1 illustrates an embodiment of an event-detection and power generator, generally referred to by reference numeral 100 and alternatively referred to herein simply as a "generator." The overall dimensions of the generator 100 are shown to be 2.5"×4.75"×1.0" in a rectangular shape and should provide at least 10 J of electrical energy. However, those skilled in the art will appreciate that other shapes and/or sizes, as well as being configured for other power outputs, are possible. FIG. 1 shows a casing 102 having a power output, such as a wire 104 and a lanyard 106 extending therefrom. The generator 100 is divided into three main sub-assemblies, as shown in FIG. 2. The sub-assemblies are the generator spring and cable drum sub-assembly 108, the clutch sub-assembly 110 and the electrical generator sub-assembly 112. Close-up views of the above three sub-assemblies and their engagements are shown in FIGS. 3, 4 and 5. The three systems are continually engaged for high reliability, and the clutch mechanism ensures that torque is only transmitted to the Electrical Generator after the cable (lanyard) has been fully extended.

The generator spring and cable drum sub-assembly 108 includes a drum 114 rotatable on a shaft 116. The lanyard (alternatively referred to as a cable) 106 is wound on the drum 114 and an end thereof 106a is routed in the interior of the casing 102 and through an opening 102a in the casing 102 by one or more surfaces and/or pulleys (not shown). The drum 114 also includes a gear 118 or other surface to transfer rotation thereof to the clutch sub-assembly 110. Inside the drum, a generator spring 120 is fixed at one end, such as to the housing at its inner diameter, and at another end, such as to the drum 114 at its outer diameter. There is preferably no energy stored in the generator spring 120 before the cable 106 is pulled. When the cable 106 is pulled (unwound from the drum 114), the generator spring 120 is wound, storing mechanical potential energy. As the generator spring 120 reaches its maximum energy storage, the cable's 106 anchor to the drum 114 is in a position of imminent release, and continuing to pull on the cable will suddenly release the cable 106 from the drum 114, allowing the generator spring 120 to convert its mechanical potential energy into kinetic energy by rotating the drum 114 which turns the electrical generator sub-assembly 112 through the clutch sub-assembly 110.

Once the cable 106 is released from the drum 114, it can be prevented from pulling out of the casing 102, such as a cable termination used to anchor the cable 106 to the drum 114 is made larger than the cable diameter such that it will not pass through the routing passages and/or the opening 102a in the casing 102. Additionally, the cable 106 can be prevented from traveling back towards the drum 114, which can cause possible interference, by the presence of a friction shoe near the point where the cable 106 exits the casing 102. This friction shoe also ensures that the cable 106 will remain properly wound on the drum 114 before the cable 106 is pulled and operation of the generator 100 commences.

As can be seen in FIG. 3, the drum gear 118 is engaged with a clutch sub-assembly input gear 122, while an output gear 124 attached to the opposite side of the clutch sub-assembly 110 engages a generator sub-assembly gear 126. A cut-away view showing the generator spring and cable drum sub-assembly 108 and the clutch sub-assembly 110 components is shown in FIG. 4. A similar cut-away view showing the electrical generator sub-assembly 112 and the clutch sub-assembly 110 components is shown in FIG. 5.

Because of the constant engagement of the drum gear 114 and the clutch input gear 122, rotation of the drum 114 turns the input gear 122 of the clutch sub-assembly 110, during both loading (unwinding to the cable 106) and unloading of the generator spring 120. The mechanism of the clutch sub-assembly 110 is configured to only transmit torque to the output gear 124 of the clutch sub-assembly 110, and therefore to the electrical generator sub-assembly 112, when the generator spring 112 is unwinding. That is, while the generator spring 120 is being wound (by pulling the cable 106), the clutch mechanism transmits no torque to the electrical generator sub-assembly 112. Clutch mechanisms so configured are well known in the art. After the cable 106 has been released from the drum 114, the torque generated by the unwinding of the generator spring 120 is transmitted to the electrical generator sub-assembly 112, which, because of the clutch mechanism, is free to spin after the generator spring 120 has unwound to its zero energy state, giving the electrical generator sub-assembly 112 increased time to convert the kinetic energy of the rotating clutch 110, generator gear 126, and generator rotor, into electrical energy, which is output through the wire(s) 104. Generators of any type, such as magnet/coil type generators can be used to generate the electrical power, the construction of which is well known in the art.

Figure 6:
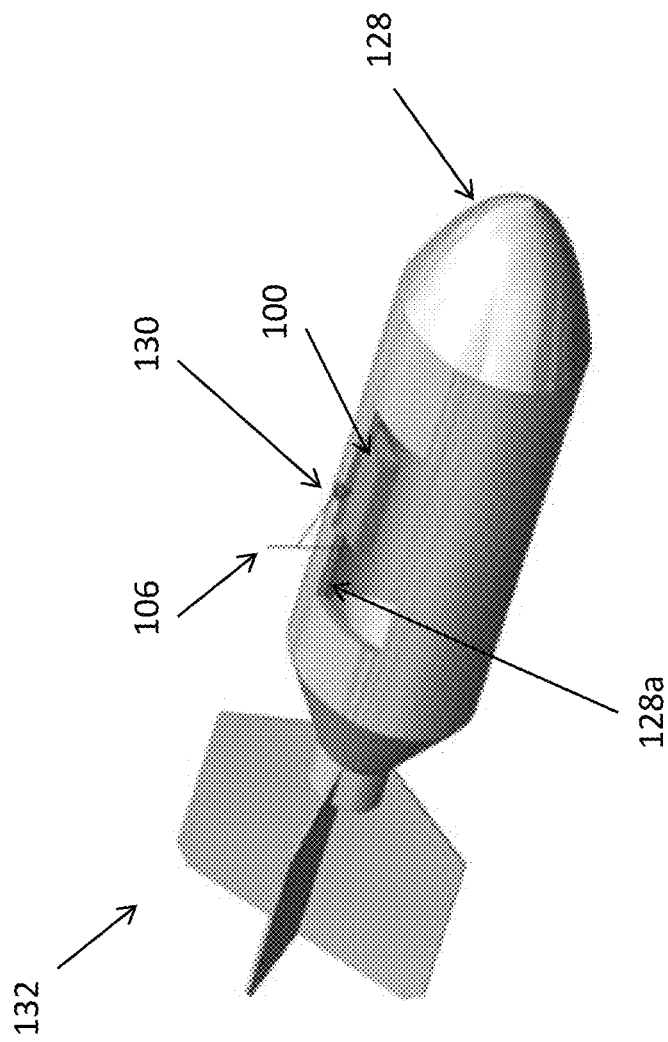
FIG. 6 illustrates a partial cut-away view showing the dynamo-type event-detection and power generator of FIG. 2 attached to an inside surface of a munition shell.
Figure 7:
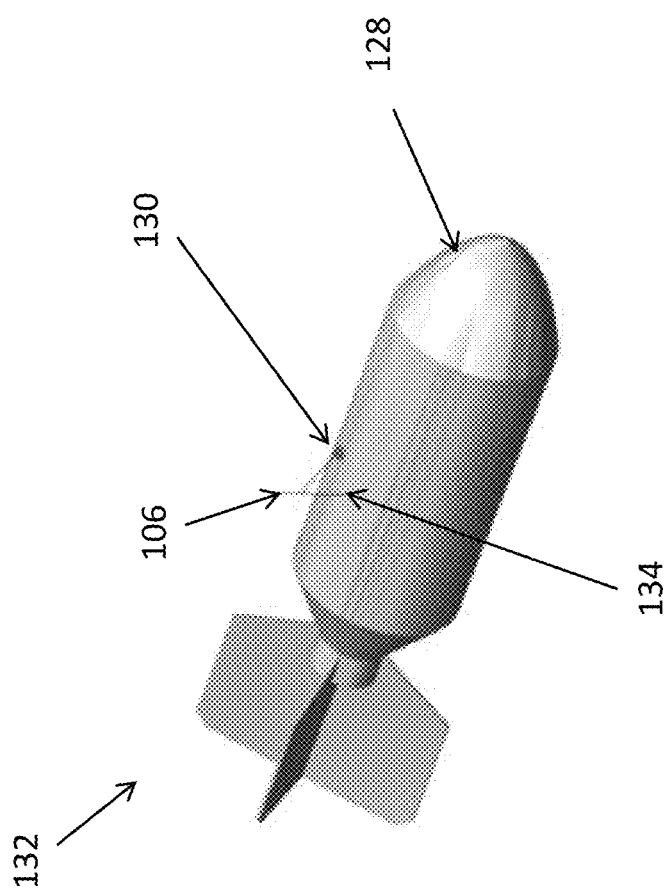
FIG. 7 illustrates an exterior view of the munition of FIG. 6 having the dynamo-type event-detection and power generator.

The dynamo-type event-detection and power generator 100 can be attached to an interior surface 128a of a munition shell 128, as shown in the cutaway view of FIG. 6. Included in FIG. 6 is an optional multi-directional pitot tube 130, which is described below and provides a means of differentiating accidental drop of the munition 132 on the ground or weapon detachment without detaching the lanyard 106 from an air drop of the munition 132. The attachment of the generator 100 to the munition shell 128 can be by any means known in the art, such as with screws through screw holes provided in the casing 102. The munition shell 128 includes a hole 134 to allow the cable/lanyard to pass through. A view of an exterior of the munition 132 is shown in FIG. 7.

Figure 8:
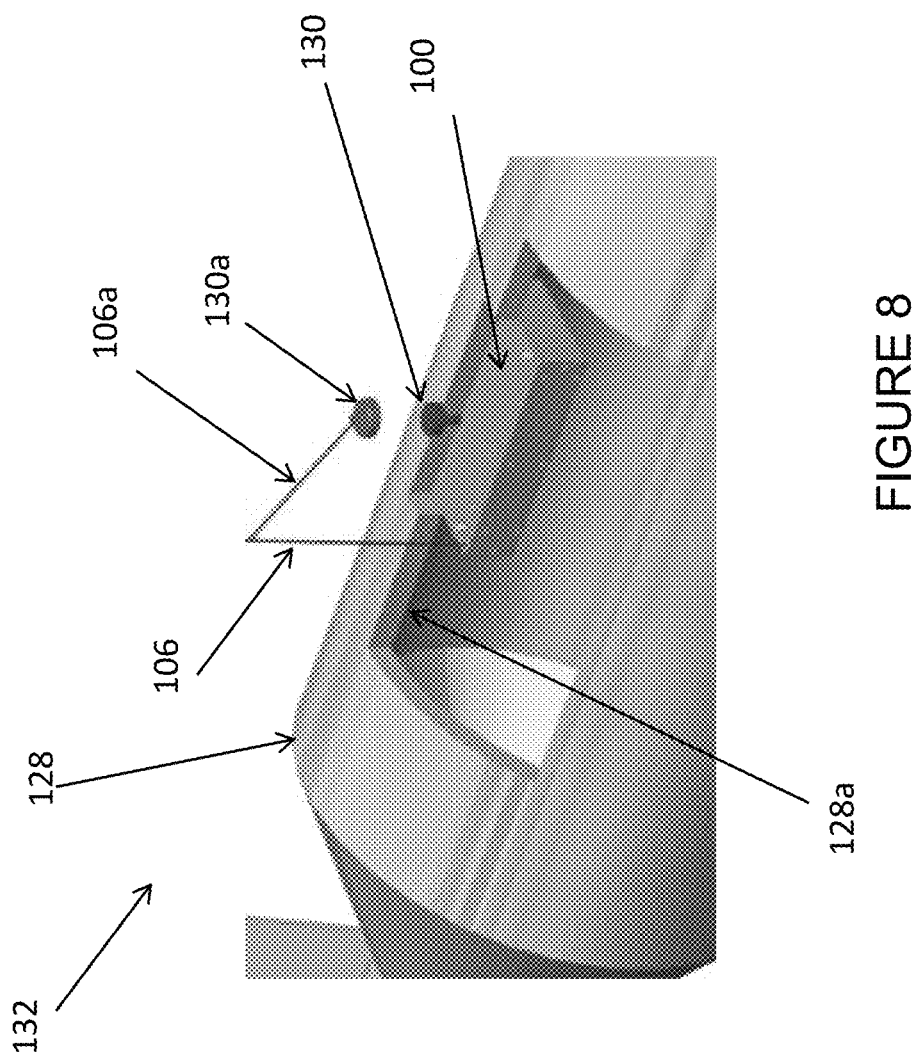
FIG. 8 illustrates a cut-away view showing the dynamo-type event-detection and power generator, the multi-directional pitot probe and its lanyard tethered cover.

When provided, the multi-directional pitot probe 130 may be routed from the generator 100 to the outer surface of the munition 132. Such a feature could augment the safe/arm characteristics by using physical aerodynamic effects in the logic of the safe/arm system. For example, a requirement that the pitot probe sense a high air-speed before arming would prevent arming if the aircraft carrying the munition 132 were not actually in-flight. The ports of the pitot tube may be fitted with a protective cover 130a, as shown in FIG. 8, which is tethered to the lanyard 106 by a secondary cable 106a. Upon pulling the cable 106 (due to separation of the munition 132 from an aircraft frame), the protective cover 130a of the pitot probe 130 would be pulled off, exposing the port(s) of the probe 130 to the atmosphere. Such a cover 130a would serve two purposes: the cover 130a would guard against debris obscuring the probe 130 and would act as a mechanical "turn-on" switch for the probe 130—only when uncovered by pulling the cable 106, 106a would the probe 130 sense any velocity.

Figure 9:
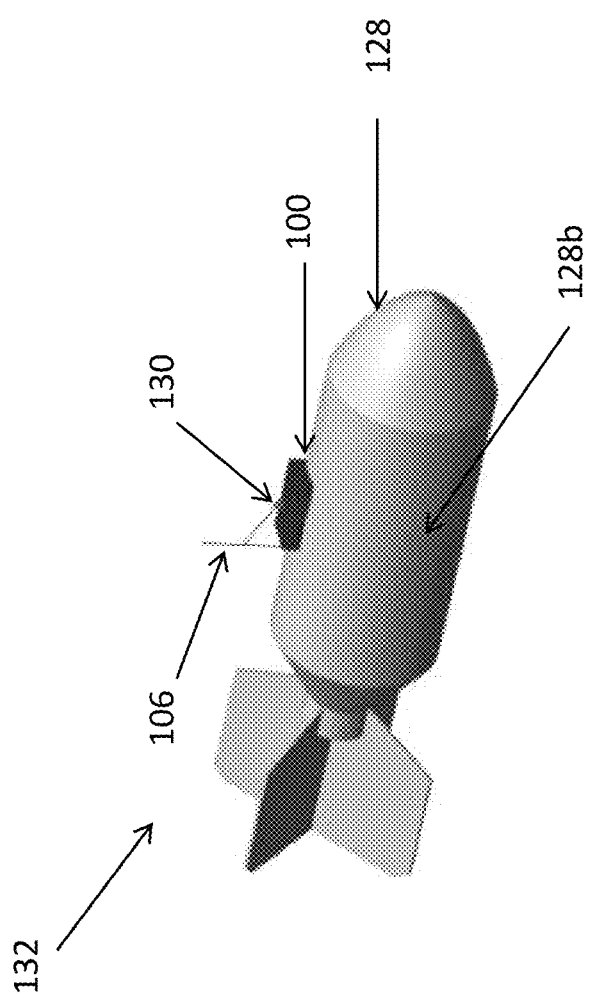
FIG. 9 illustrates an alternative mounting configuration of the dynamo-type event-detection and power generator on the exterior surface of munition shell.

For weapon systems which cannot accommodate the generator 100 on the interior of the munitions shell 128, the generator 100 may be fixed to an exterior surface 128b of the munition shell 128, as is shown in FIG. 9. Naturally, the contour and dimensions of such a generator would be altered to minimize the drag and avoid interference with adjacent hardware. Such a mounting of the generator 100 will only require a small hole in the shell 128 to pass the generator wire 104 to an interior of the munition 132. Alternatively, the generator wire(s) 104 may be routed from the outside of the shell to, e.g., the weapon fuzing.

The generator 100 discussed above employs a gear train to connect the various sub-assemblies and occupies a prismatic volume with a relatively small height. Alternatively, a coaxial generator, in which the various sub-assemblies are arranged along a common axis can be employed where the occupied volume is generally cylindrical. Because of their distinct form-factors and mode of operation, the generator designs can fit the requirements of different munition systems.

Figure 10:
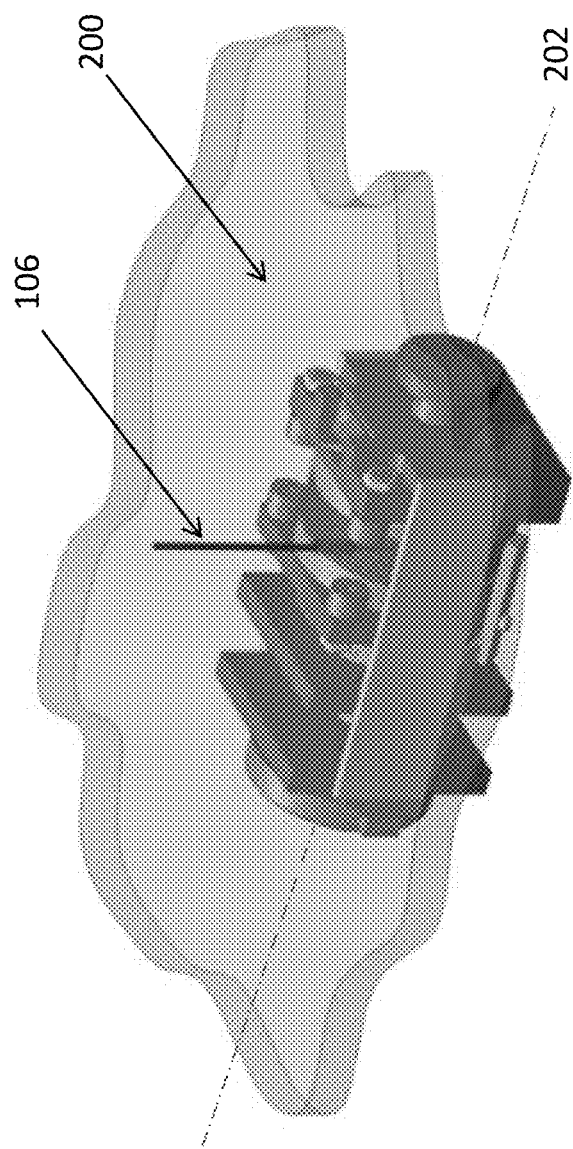
FIG. 10 illustrates an isometric view of an alternative embodiment of a dynamo-type event-detection and power generator, shown through a portion of a munition shell (shown transparent so as to see the generator therethrough).
Figure 16:
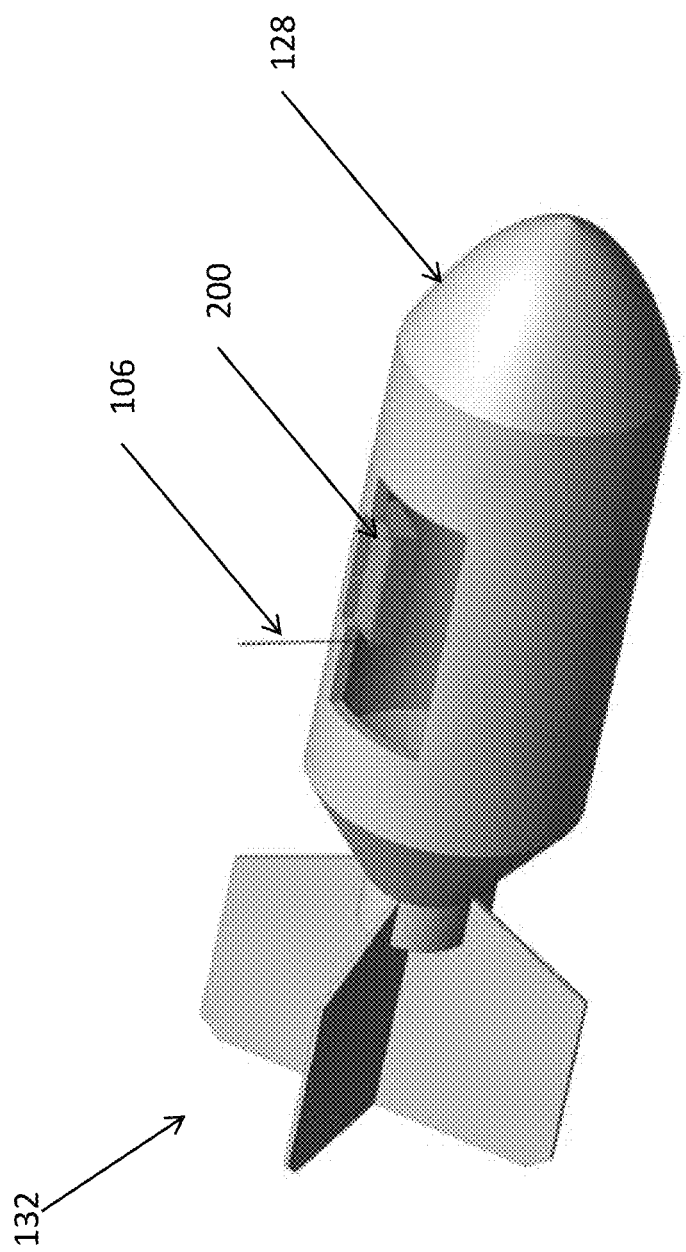
FIG. 16 illustrates a partial cut-away view showing the dynamo-type event-detection and power generator of FIG. 10 attached to an inside surface of a munition shell.

FIG. 10 illustrates a generator 200 having its sub-assemblies disposed along a common axis 202 and therefore occupies a generally cylindrical volume. The generator 200, shown in FIG. 10, and as is shown in FIG. 16, can be located within the munition shell 128 and only the cable 106 need be routed through the shell 128 of the munition 132. This is an improvement over such methods as deployable impellers, since the compromise of shell integrity for passing a small (e.g., ⅛" diameter or less) cable 106 through the shell 128 is much less than the opening needed for an entire impeller-generator. In FIGS. 10-16, like reference numerals denote like features as compared to the generator 100 discussed above.

Figure 11:
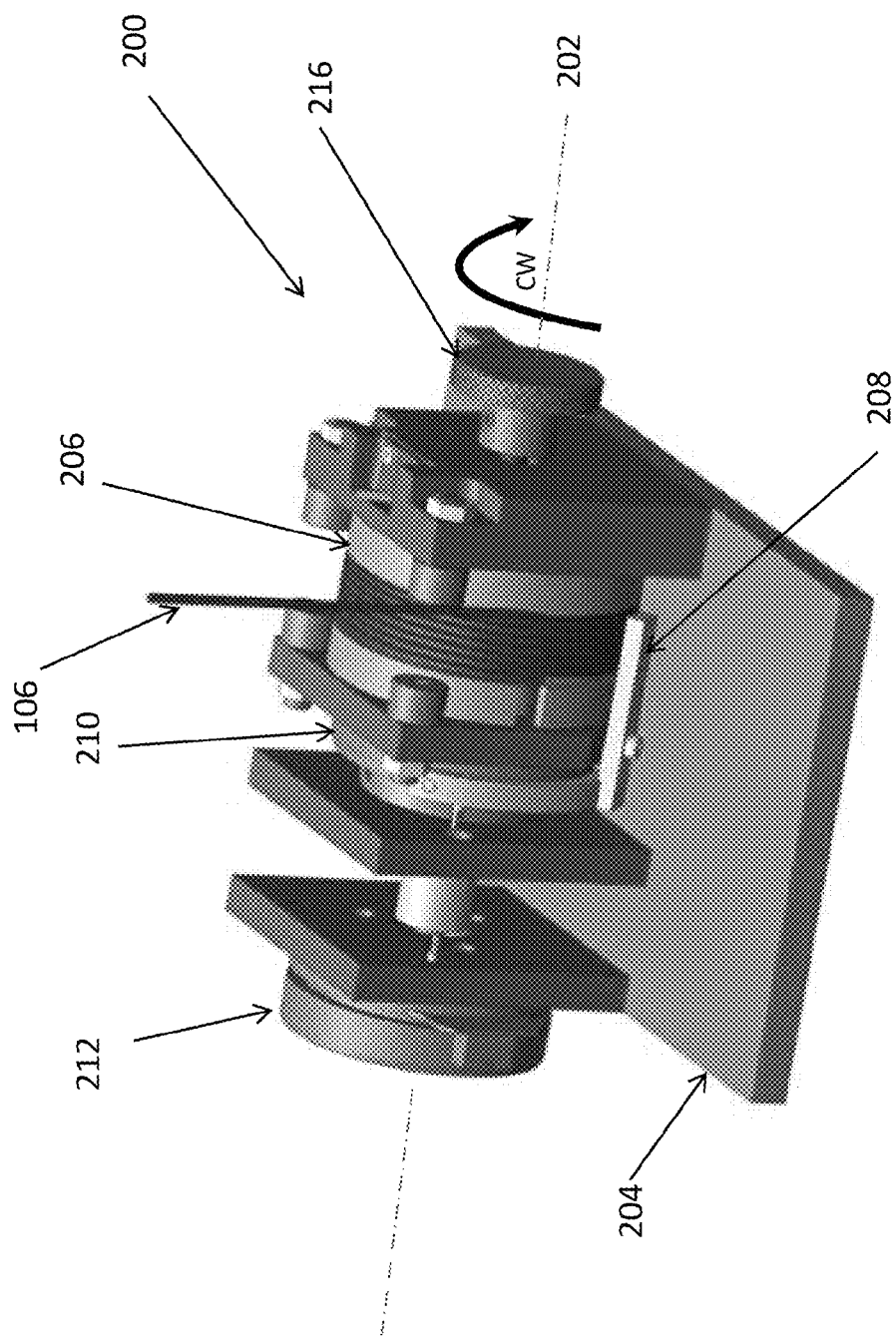
FIG. 11 illustrates the dynamo-type event-detection and power generator of FIG. 10, shown with an optional bottom plate.

FIG. 11 shows the generator 200, which can be mounted on a common base plate 204 with the components exposed on three sides for ease of assembly and service. However, such base plate 204 is not necessary to the generator 200 (as is shown in FIG. 10). During assembly, the cable 106 is wound around a cable drum 206 and a locking arm 208 can be used to immobilize a flywheel 210 and electromagnetic generator 212 connected in series to the drum 206. The drum 206 includes a power spring 214, visible in the cutaway view of FIG. 12, which is preferably unloaded (storing no potential energy) when the generator 200 is assembled and installed in the munition 132 so that no electricity will be generated unintentionally.

Figure 12:
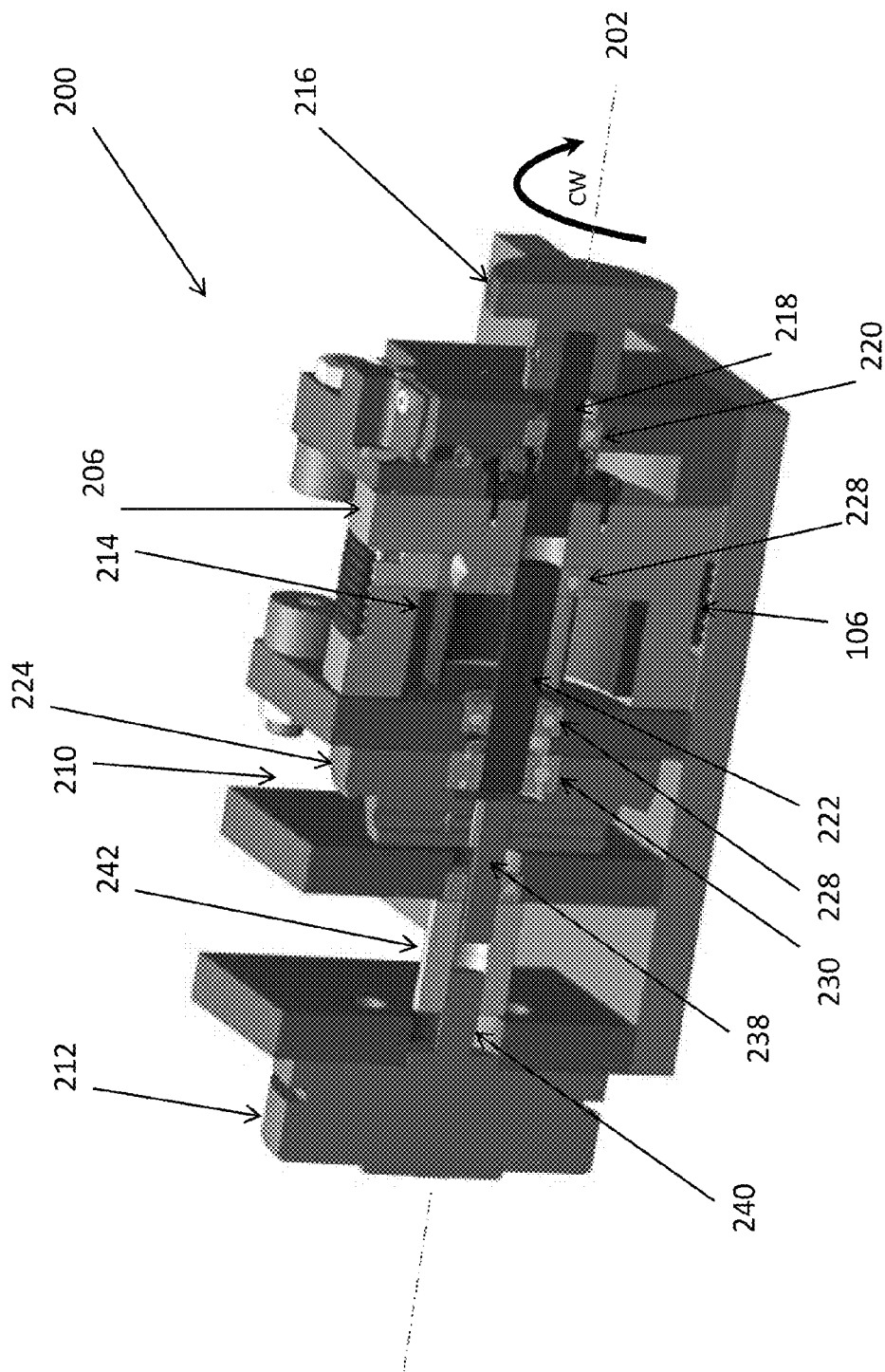
FIG. 12 illustrates a section view of the dynamo-type event-detection and power generator of FIG. 11.
Figure 13:
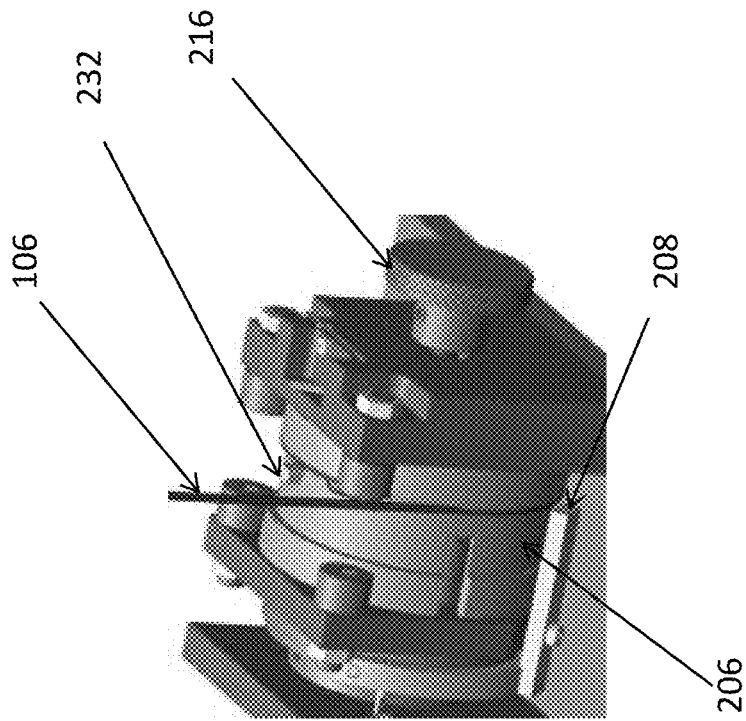
FIG. 13 illustrates a ratchet and pawl mechanism of the dynamo-type event-detection and power generator of FIG. 11.
Figure 14:
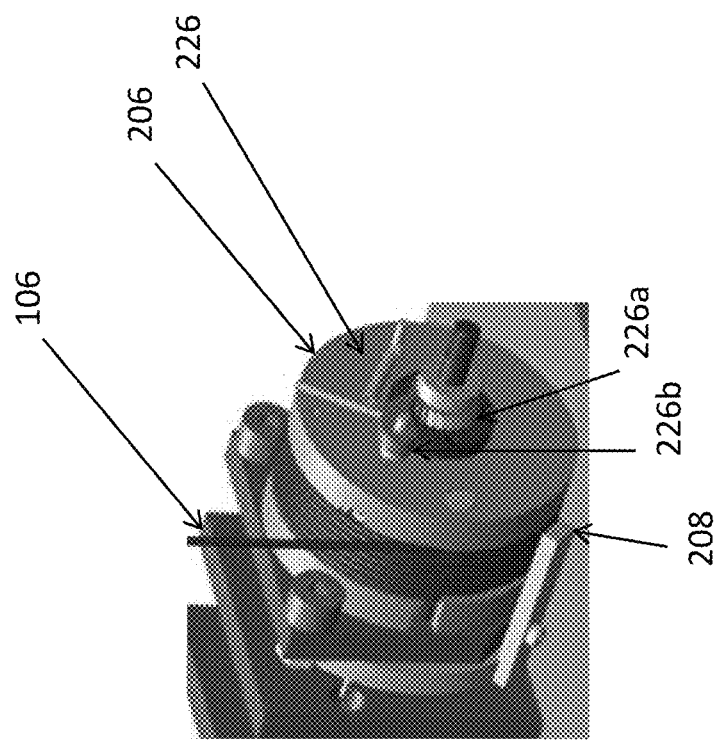
FIG. 14 illustrates a flywheel release trigger pin mechanism of the dynamo-type event-detection and power generator of FIG. 11.
Figure 15:
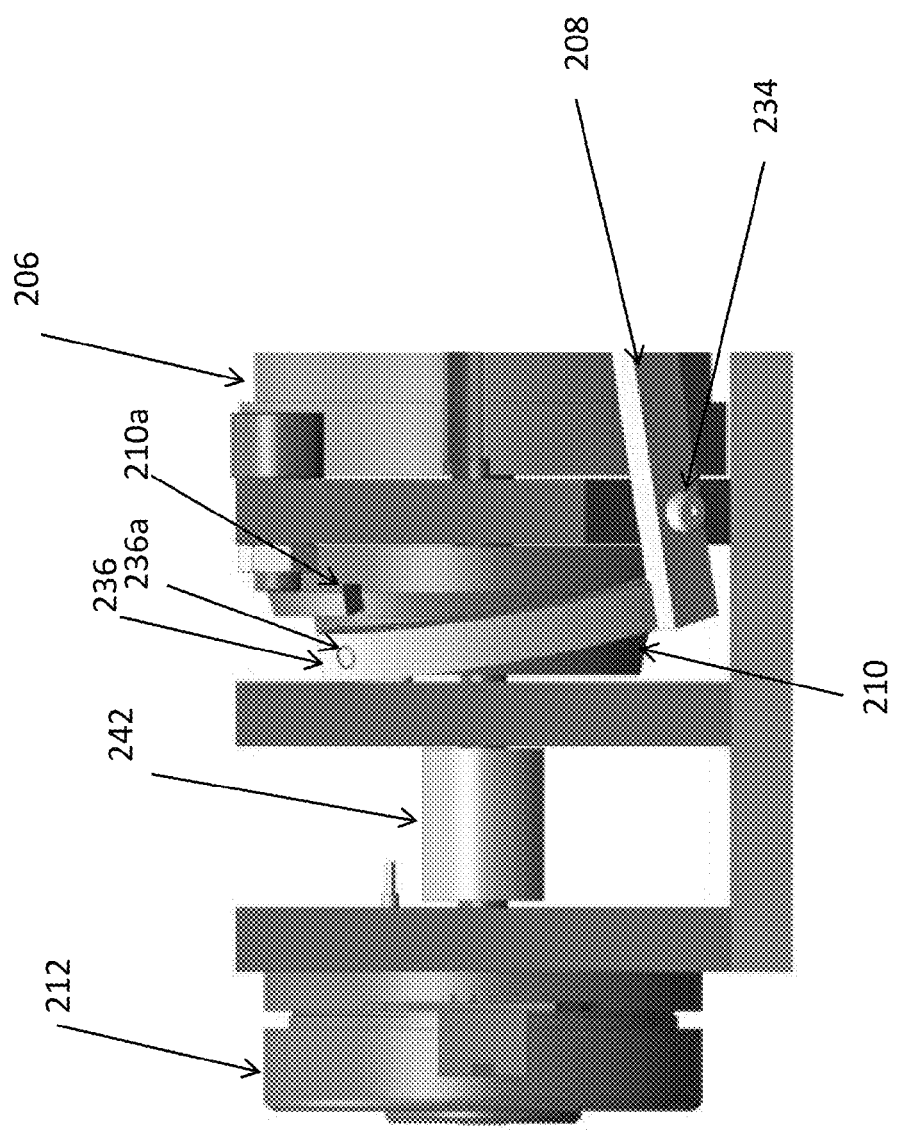
FIG. 15 illustrates the locking arm of the dynamo-type event-detection and power generator of FIG. 11 in which the locking arm is disengaged from the flywheel.

The generator 200, from right side of FIG. 12 towards the left includes the following sequence of operation. An optional manual rewind knob 216 is provided to rewind a shaft 218 connected to the cable drum 206. Bearing 220 can be used to facilitate easy operation of the rewind knob 216. An arbor shaft 222 rotatably connects the drum 206 to an input portion 224 of the flywheel 210. One or more bearing 228 are used to facilitate rotation of the arbor shaft 222. A clutch bearing 230 is provided such that torque is transmitted from the arbor shaft 222 to the flywheel 210 only in the clockwise direction. Because the flywheel 222 is immobilized, the arbor shaft 222 is immobilized in the clockwise direction as well. The cable drum 206 is free to rotate in the clockwise direction, but is prevented from rotation in the counterclockwise direction by a rotation restriction device, such as a ratchet-and-pawl mechanism 226 (see FIG. 13 in which a side wall of the housing is removed so that the mechanism 226 is visible) having a ratchet 226a and engaging pawl 226b disposed about a rotating shaft 218 of the drum 206. When the cable 106 is pulled, the cable drum 206 rotates in the clockwise direction. One end of the power spring 214, such as an outermost turn of the power spring 214 is anchored to the cable drum 206, such as an inside of the cable drum 206, and another end of the power spring 214, such as an innermost turn of the power spring 214 is anchored to the (clockwise-immobilized) arbor shaft 222. Therefore, as the cable 106 is pulled, the power spring 214 is deflected, storing mechanical potential energy.

The number of cable 106 wraps on the cable drum 206 corresponds to the maximum angular deflection of the power spring 214. When the penultimate cable wrap is unwound from the drum 206, a spring-loaded trigger pin 232 protrudes from the outer diameter of the cable drum (see FIG. 14). As the cable 106 is pulled further, the exposed trigger pin 232 protrudes from the cable drum 206 and will engage the locking arm 208, rotating it about pivot 234, such that an end 236 of the locking arm 208 is disengaged with the flywheel 210 and the flywheel 210 is released to rotate (see FIG. 15). The end 236 can have any means known in the art for engaging to and disengaging from the flywheel 210, such as a pin 236a which engages which a slot 210a on the flywheel.

When the flywheel 210 is unlocked, the torque of the power spring 228 will drive the flywheel 210 and electromagnetic generator 212, connected to the flywheel by way of shafts 238, 240 and coupling 242, in the clockwise direction through the clutch bearing 230, generating electricity. The ratchet-and-pawl mechanism 226 will provide the necessary reaction torque to the cable drum 206 so that the torque of the power spring 214 is not wasted driving the cable drum 206 in the counterclockwise direction. Once the power spring 214 has fully unwound, the flywheel 210 and the rotor of the electromagnetic generator 212 will still store energy in the form of rotational kinetic energy which has yet to be extracted by the magnets and coils of the electromagnetic generator 210. If the power spring 214 were continuously connected to the flywheel 210 and electromagnetic generator 212, this energy would simply be passed back and forth between the kinetic energy of the flywheel system and the potential energy of the spring deflection in a series of direction reversals, lowering efficiency and wasting energy. Instead, because of the orientation of the clutch bearing 230, the flywheel 210 and electromagnetic generator 212 are free to "over-run" and continue to spin in the clockwise direction after the power spring 214 has passed its full complement of potential energy to the downstream sub-system.

While the above generators 100, 200 can provide the energy requirement to the munition systems, the addition of piezoelectric devices may provide electrical power to augment the power spring generators 100, 200, or to fill gaps in the timeline of the energy requirements. For example, a given weapon platform may benefit from a separate, earlier, somewhat smaller parcel of energy while the weapon is being dropped as opposed to after the weapon has been fully jettisoned from the aircraft.

Figures 17, 18:
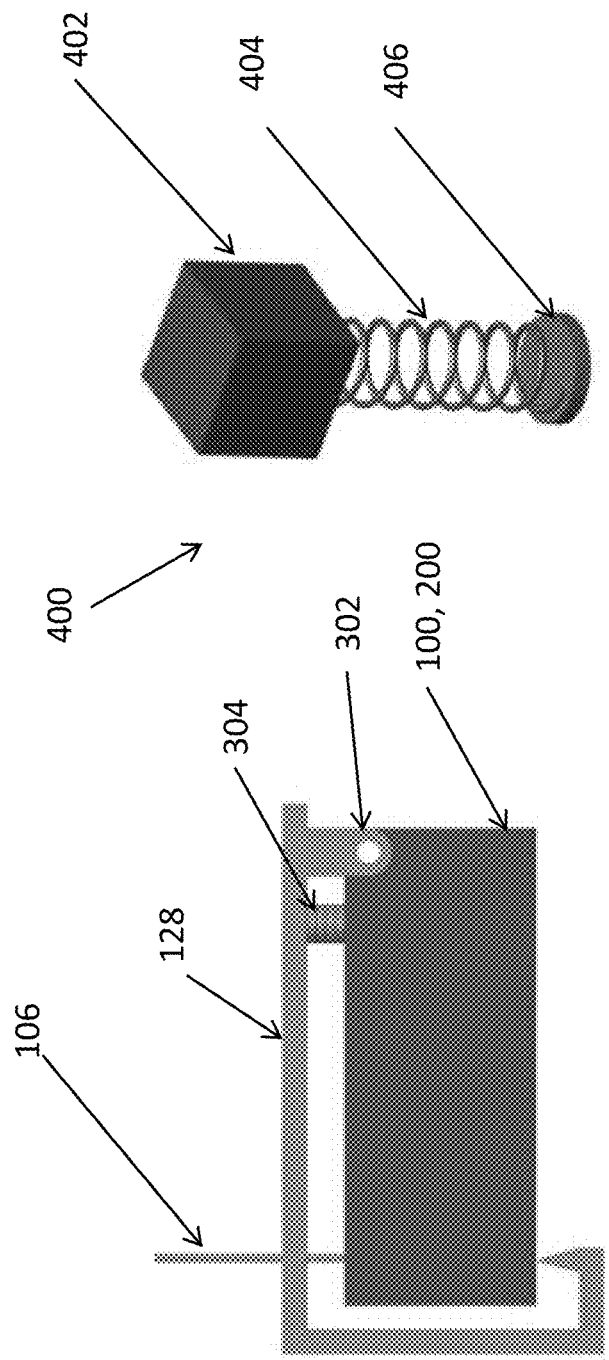
FIG. 17 illustrates an alternative mounting of the dynamo-type event-detection and power generators attached to an inside surface of a munition shell.
FIG. 18 illustrates a schematic of a mass-spring piezoelectric generator.

One method to achieve this result is to place piezoelectric elements at the mounting points of the generator within the weapon chassis. As the cable is pulled, the reaction force on the generator will load the piezoelectric elements directly, providing electricity. Considering that the forces involved in pulling the cable may be considerably less that the forces required to achieve considerable voltage (energy) on the piezoelectric elements, one can easily envision configuring the mounting of the generator such that the force on the piezoelectric elements is amplified through leverage, as shown schematically in FIG. 17. FIG. 17 illustrates a generator 100, 200 pivotably mounted to the munition shell 128 by way of a pivot 302. A piezoelectric element, or stack thereof 304 are provided between the generator casing 102 and munition shell 128, such as near the point of pivot 302. One or more of such stacks 304 can be provided. As the cable 106 is pulled, the reaction force on the generator will load the piezoelectric elements 304 directly, providing electricity to augment the power spring generators 100, 200, or to fill gaps in the timeline of the energy requirements. Wiring and/or conditioning circuitry, if necessary, for the generators 100, 200 and piezoelectric stack(s) 304 are well known in the art and not shown for the sake of simplicity.

Another alternative is to incorporate a spring-mass piezoelectric generator 400 such as that shown in its simplest form schematically in FIG. 18. The piezoelectric generator 400 can be mated to the power spring generators 100, 200 as follows. As the cable 106 is unwound from the cable drum 114, 206, an element, such as a projection, on the cable 106 would engage the mass element, 402 displacing it and then passing by, suddenly releasing the mass 402 into free vibration about the spring 404. Once vibrating, the piezoelectric element 406 may harvest the energy stored in the displaced spring over many cycles (i.e., the spring would apply a cyclic force to the piezoelectric element 406 as is pulls on the same each time the mass 402 vibrates away from the piezoelectric element 406).

The power-spring-based energy harvesting generators 100, 200 use as an input the forces produced when a gravity-dropped munition, such as a bomb, is jettisoned from an aircraft. The generator 200 has its subsystems in a co-axial arrangement and uses the locking and unlocking of various components to achieve power generation only after the weapon has been fully jettisoned from the aircraft.

The generator 100 uses a gear train and the bi-directional rotation of the input cable drum to achieve power generation, again, only after the weapon has been fully deployed.

It is likely that each generator 100, 200, because of its particular form-factor and mode of operation, will find utility in a particular class of weapon systems. Additionally, it is possible to take aspects of each design to synthesize new generator mechanisms, as well as attempting to reconfigure each of the two form factors, i.e. packaging the locking-and-unlocking mechanisms of the current co-axial design into a gear-train system, and packaging the bi-directional rotation of the input cable drum of the gear-train system into a coaxial arrangement.

Turning now to FIG. 19, there is illustrated a schematic of the generators 100, 200 disposed in the shell 128 of a munition, where the munition has been separated from an airframe 500 of an aircraft (by means well known in the art). Thus, such separation acts to pull on the cable 106 to produce power as discussed above, which can be provided to internal components of the munition, such as fuzing and/or electrical/electronic devices 502 associated with the munition. As discussed above, the separation can also remove a pitot tube cover 130a to provide a means of differentiating accidental drop of the munition on the ground or weapon detachment without detaching the cable 106 from an air drop of the munition from the airframe 500.

Although the generators 100, 200 have been described with regard to providing power to a munitions upon separation of the munition from an aircraft, such generators 100, 200 have utility in other devices. For example, such generators can be used in portable handheld devices that require power (to either replace a battery, supplement a battery or charge a battery or other power storage device (e.g., capacitor), including laptop computers, flashlights, cell phones etc. In such devices, the generators 100, 200 are provided in/on the device and the lanyard can be actively pulled by a user to produce power. If such generators are to be re-used in the device, a means for re-winding the cable on the drum can be provided, such as a manual rewind or automatic rewind, such as providing the drum with a return spring (which can be the power spring or an additional return spring).

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A generator comprising:
   a drum having a cable wound thereon, the cable having a free end, wherein the drum includes a drum gear which turns with the drum, the cable being releasable from the drum after being unwound from the drum;
   a spring for storing energy as the cable is unwound from the drum by pulling on the free end;
   an electromagnetic generator operatively connected to the drum such that rotation of the drum is transferred to an input side of the electromagnetic generator after the cable is unwound from the drum and the stored energy in the spring turns the member, wherein the electromagnetic generator includes a generator input gear on the input side at least indirectly connected to the drum gear; and
   a clutch having a clutch input gear engaged with the drum gear and a clutch output gear engaged with the generator input gear, wherein the clutch is configured to transfer rotation of the clutch input gear to rotation of the clutch output gear after the cable is unwound and released from the drum and the stored energy in the spring turns the drum.

2. The generator of claim 1, further comprising a casing having an opening to expose the free end of the cable.

3. The generator of claim 2, wherein the spring has a first end connected to the drum and a second end connected to the casing.

4. The generator of claim 1, further comprising a shaft connecting the drum and the clutch input gear.

5. The generator of claim 4, wherein the spring has a first end connected to the drum and a second end connected to the shaft.

6. The generator of claim 5, further comprising a flywheel having an input selectively engaged with an output of the clutch output gear and an output operatively connected to an input of the electromagnetic generator.

7. The generator of claim 6, further comprising a mechanism for locking and unlocking the flywheel.

8. The generator of claim 1, wherein the electromagnetic generator is electrically connected to a device for providing power to a component of the device.

9. The generator of claim 8, wherein the device is a munition.

10. The generator of claim 2, further comprising a secondary generator for producing power resulting from motion of the casing.

11. The generator of claim 10, wherein the secondary generator is one or more piezoelectric elements.

* * * * *